July 3, 1934.  J. F. GAYLORD  1,965,117
CLUTCH MECHANISM
Filed Dec. 26, 1930  2 Sheets-Sheet 2
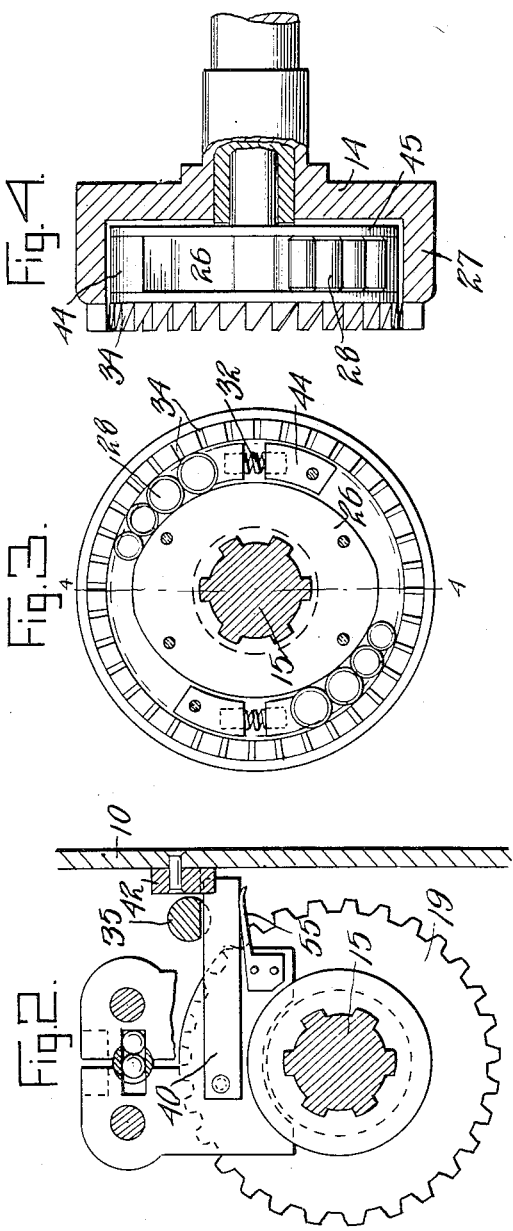
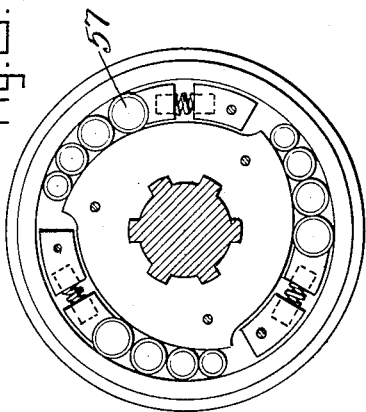
Inventor
John F. Gaylord Patented July 3, 1934

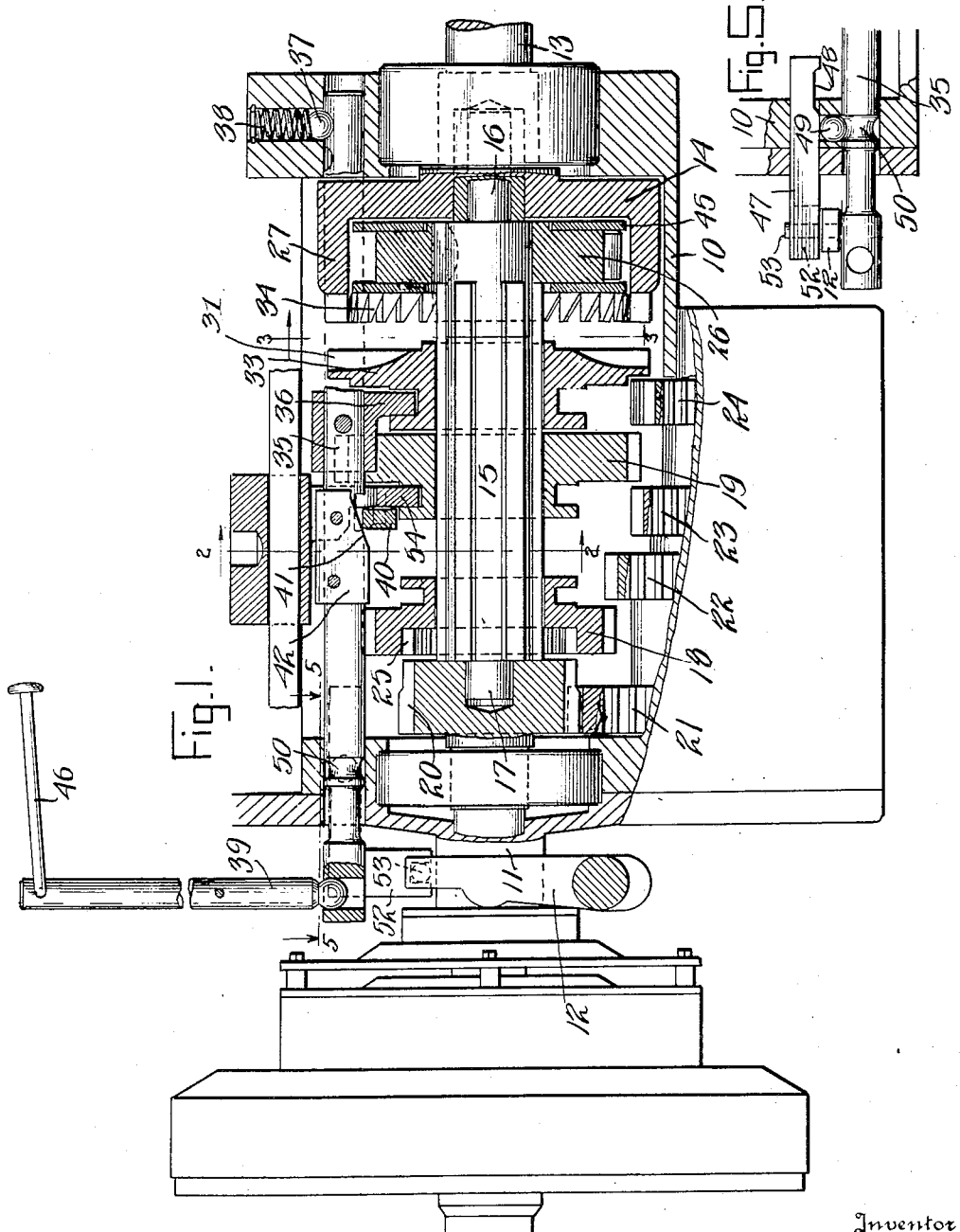

1,965,117

UNITED STATES PATENT OFFICE 1,965,117

CLUTCH MECHANISM

John Fletcher Gaylord, Muncie, Ind., assignor, by direct and mesne assignments, to The Gaylord Company, Inc., Homer, La., a corporation of Louisiana Application December 26, 1930, Serial No. 504,890

2 Claims. (Cl. 74—58)

This invention relates to clutches for motor vehicles and particularly to means for permitting the vehicle to coast freely as when going down grade without driving the engine or transmission gears.

An object of the invention is to provide means whereby gear shifting may be smoothly and quickly performed.

A further object is to synchronize driving and driven parts of the machine prior to their being clutched together in order to secure a smooth, noiseless shifting of gears.

Further objects and advantages will become apparent as the description proceeds.

Referring to the accompanying drawings, which are made a part hereof and on which similar reference characters indicate similar parts, Figure 1 is a vertical section of an automobile gear shifting mechanism showing my invention applied thereto, Figure 2, a section on line 2—2 of Figure 1, Figure 3, a section on line 3—3 of Figure 1, Figure 4, a section on line 4—4 of Figure 3, Figure 5, a section on line 5—5 of Figure 1, and Figure 6, a view similar to Figure 3 of a modified form.

In the drawings numeral 10 indicates the usual housing for the transmission gears of an automobile. 11 indicates the driving shaft from the engine, and 12 denotes the clutch lever.

A driven shaft 13 is connected to the driven portions of the vehicle. The shaft 13 has an enlarged bell-shaped end 14 mounted within the housing 10. An intermediate shaft 15 is mounted within the housing and has a small end 16 journaled in the inner end of the shaft 13 and has another small end 17 seated within the end of the driving shaft 11. The intermediate shaft 15 has gears 18 and 19 slidable thereon. A gear 20 on the driving shaft 11 meshes with a gear 21 on an auxiliary shaft on which shaft are mounted gears 22, 23, 24. The gear 18 has internal gear teeth 25 which mesh with the external teeth on the gear 20 when the gears are in position for direct or high speed driving. During intermediate speed the driving is through the gears 20, 21, 22 and 18. For low speed the gear 19 is put in mesh with the gear 23 and for reverse the gear 19 is moved to engage an intermediate gear not shown which is driven by the gear 24. The construction just defined is conventional driving gear of an automobile and need not be further described.

It is understood of course that the gears 18 and 19 are slidable axially on the intermediate shaft 15 by means of gear shifting levers not shown but which are of well known construction. Secured on the end of the intermediate shaft 15 is a cam 26 and positioned between the periphery of the cam and the flange 27 of the bell shaped end 14 are rollers 28. These rollers are of different size as shown in order to be engaged by the contour of the cam 26 which cam is oval in cross section. The rollers 28 are urged counter clockwise by springs 32 which seat against blocks 44 secured to plates 45 at the front and rear of the cam 26. The cam is keyed to and rotatable with the intermediate shaft 15. A ring 33 is slidable axially on the shaft 15 but is keyed thereto to rotate with the shaft. Beveled teeth 31 on the ring engage oppositely beveled teeth 34 on the face of the bell 27. The ring 33 is movable axially on the shaft 15 by means of a shaft 35 having a depending member 36 engageable in a groove on the ring 33. The shaft 35 is held in locked position by means of ball 37 and a spring 38. The shaft 35 is moved axially by means of a lever 39 which is manually operated by a link 46.

Means for locking the shaft 35 against movement except when the clutch is pressed out is shown in Figure 5. This consists of a bar 47 slidably mounted in the housing 10. This bar has a notch at 48 in which a ball 49 engages to release the ball from notch 50 on the shaft 35. The front end of the bar 47 has a depending forked portion 52 which is engageable by a pin 53 secured on the clutch lever 12.

A latch 40 is pivoted to the gear shifting fork 54 and is urged upwardly by means of a leaf spring 55 to engage a notch in the side of the shaft 35. A plate 42 is secured on the housing 10 and has a beveled edge 41 which engages the top edge of the latch. When the gear 19 is moved to the right into position for reverse the latch engages in the notch in the shaft 35 and carries the shaft with it to bring the teeth on ring 33 in mesh with those on the bell-shaped end 14. When the gear 19 is moved to neutral and to the intermediate speed positions the bevel 41 depresses the latch to disengage it from the shaft 35 so that the shaft may be freely manually moved.

In operation the teeth on the ring 33 are normally in engagement with the teeth 34 to drive the shaft 13. When in this position any coasting of the automobile must also drive the engine. If the operator wishes to coast without driving the engine the lever 39 is operated to move the ring 33 to the position shown in Figure 1. When in this position so long as the engine tends to run faster than the vehicle the vehicle will be positively driven by the shaft 15 and the cam 26, the periphery of which engages the rollers 28 which rollers engage in turn with the interior of the bell 27. If, however, the vehicle tends to run faster than the engine, such as in going down grade, the bell 27 may freely rotate clockwise independently of the cam 26 since the rollers 28 will be urged toward the enlarged portion of the space between the periphery of the cam and the interior of the bell. When in reverse the clutch teeth 31 will engage clutch teeth 34, but it is never necessary to coast when running backwards. By reason of the bevel on the teeth 31 and 34 the clutch members can be brought into mesh without jamming since the bevel will tend to rotate the driving shaft 15 in the direction for driving the car backward but will not tend to rotate it in the opposite direction. Should there be a tendency to rotate the clutch member 33 and shaft 15 forward, the cam 26 would engage the rollers 28 and jam rotation of the shaft 15 and hence prevent meshing of the gears.

In Figure 6 is shown a modified form of cam in which three sets of driving rollers 57 are used; this provides a more rigid connection under some conditions.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. In a free wheeling device of the class described, in combination a power unit, a driving shaft, a clutch between said power unit and driving shaft, an intermediate driven shaft, a low and reverse gear slidable on said intermediate shaft, a fork for shifting said gear, a slidable clutch engaging member on said shaft adjacent said gear, a rod for operating said clutch member, a main driven shaft having a clutch member formed thereon and adapted to coact with said slidable clutch engaging member, a notch in said rod, a spring-pressed pawl on the fork of said sliding gear adapted to coact with said notch when said gear is moved to reverse position, and a stationary cam for disengaging said pawl when said gear is in neutral position, substantially as set forth.

2. In a free wheeling device, in combination, a power unit, a driving shaft, a clutch for connecting the power unit and the driving shaft, an intermediate shaft, a low and reverse gear slidable on said intermediate shaft, means for shifting said gear, a clutch engaging member slidably mounted on said shaft adjacent said gear, a rod for operating said clutch engaging member, a driven shaft having a clutch formed thereon adapted to coact with said slidable clutch engaging member, a notch in the said rod, spring pressed means on the said gear shifting means adapted to coact with the said notch when said gear is moved to reverse position, and stationary means for disengaging said spring pressed means when said gear is moved to neutral position.

JOHN FLETCHER GAYLORD.